US012070839B2

(12) United States Patent
Nakamoto et al.

(10) Patent No.: US 12,070,839 B2
(45) Date of Patent: Aug. 27, 2024

(54) IMPACT ROTARY TOOL, TORQUE CALCULATION METHOD, AND PROGRAM

(71) Applicant: Panasonic Intellectual Property Management Co., Ltd., Osaka (JP)

(72) Inventors: Masanori Nakamoto, Mie (JP); Hiroaki Murakami, Mie (JP); Akiko Honda, Osaka (JP); Kimitaka Ozawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 14 days.

(21) Appl. No.: 18/043,686

(22) PCT Filed: Jul. 28, 2021

(86) PCT No.: PCT/JP2021/027876
§ 371 (c)(1),
(2) Date: Mar. 1, 2023

(87) PCT Pub. No.: WO2022/054438
PCT Pub. Date: Mar. 17, 2022

(65) Prior Publication Data

US 2023/0271306 A1 Aug. 31, 2023

(30) Foreign Application Priority Data

Sep. 11, 2020 (JP) ................................ 2020-153312

(51) Int. Cl.
*B25B 23/00* (2006.01)
*B25B 21/02* (2006.01)
*B25B 23/147* (2006.01)

(52) U.S. Cl.
CPC .......... *B25B 23/1475* (2013.01); *B25B 21/02* (2013.01)

(58) Field of Classification Search
CPC . B25B 21/02; B25B 23/1405; B25B 23/1453; B25B 23/1475
See application file for complete search history.

(56) References Cited

U.S. PATENT DOCUMENTS 4,185,701 A 1/1980 Boys
2005/0167130 A1* 8/2005 Setter ................. B25B 23/1405 173/176

(Continued)

FOREIGN PATENT DOCUMENTS

JP H07-246529 A 9/1995
JP 2018-089704 A 6/2018

(Continued)

OTHER PUBLICATIONS

Extended European Search Report dated Feb. 19, 2024 issued in the corresponding European Patent Application No. 21866398.7.

(Continued)

*Primary Examiner* — Eyamindae C Jallow
(74) *Attorney, Agent, or Firm* — Rimon P.C.

(57) ABSTRACT

An impact rotary tool includes a drive source, an impact force generator, an output shaft, a torque measuring unit, and a torque calculator. The impact force generator is configured to generate impact force in pulse form from power of the drive source. The output shaft is configured to transmit the impact force to a tip tool. The torque measuring unit is configured to measure a torque applied to the output shaft. The torque calculator is configured to, when a torque waveform of the torque measured by the torque measuring unit during one impact includes a plurality of peak values, calculates the tightening torque in accordance with a largest peak value of one or more second or subsequent peak values.

10 Claims, 7 Drawing Sheets

(56) References Cited

U.S. PATENT DOCUMENTS

| | | | | |
|---|---|---|---|---|
| 2011/0073334 | A1* | 3/2011 | Iimura | B25B 21/02 173/217 |
| 2013/0320902 | A1* | 12/2013 | Sugie | H02P 7/29 318/450 |
| 2017/0246732 | A1* | 8/2017 | Dey, IV | B25B 23/1475 |
| 2019/0321949 | A1 | 10/2019 | Miyazaki | |
| 2024/0051095 | A1* | 2/2024 | Ni | B25F 5/001 |

FOREIGN PATENT DOCUMENTS

| | | | |
|---|---|---|---|
| JP | 2018-122392 | A | 8/2018 |
| WO | 2018/100801 | A1 | 6/2018 |

OTHER PUBLICATIONS

International Search Report dated Oct. 12, 2021 issued in International Patent Application No. PCT/JP2021/027876, with English translation.

* cited by examiner

IMPACT ROTARY TOOL, TORQUE CALCULATION METHOD, AND PROGRAM

CROSS-REFERENCE OF RELATED APPLICATIONS

This application is the U.S. National Phase under 35 U.S.C. § 371 of International Patent Application No. PCT/JP2021/027876, filed on Jul. 28, 2021, which in turn claims the benefit of Japanese Patent Application No. 2020-153312, filed on Sep. 11, 2020, the entire disclosures of which Applications are incorporated by reference herein.

TECHNICAL FIELD

The present disclosure generally relates to impact rotary tools, torque calculation methods, and programs, and specifically, to an impact rotary tool configured to generate impact force in pulse form from power of a drive source, a torque calculation method for calculating a tightening torque of the impact rotary tool, and a program configured to cause one or more processors to execute the torque calculation method.

BACKGROUND ART

Patent Literature 1 describes an impact rotary tool, wherein the number of strikes (impacts) exerted on an output shaft by an impact mechanism is counted, and rotation of a motor (drive source) is stopped when the number of impacts thus counted reaches a shut-off impact number.

CITATION LIST

Patent Literature

Patent Literature 1: JP 2018-89704 A

SUMMARY OF INVENTION

It is desirable to accurately calculate a tightening torque when an impact rotary tool tightens a fastener component such as a screw.

In view of the foregoing, an object of the present disclosure is to provide an impact rotary tool configured to accurately calculate a tightening torque for tightening a fastener component, a torque calculation method, and a program.

To achieve the object, the impact rotary tool according to an aspect of the present disclosure includes a drive source, an impact force generator, an output shaft, a torque measuring unit, and a torque calculator. The impact force generator is configured to generate impact force in pulse form from power of the drive source. The output shaft is configured to transmit the impact force to a tip tool. The torque measuring unit is configured to measure a torque applied to the output shaft. The torque calculator is configured to calculate a tightening torque in accordance with the torque measured by the torque measuring unit. The torque calculator is configured to, when a torque waveform of the torque measured by the torque measuring unit during one impact includes a plurality of peak values, calculate the tightening torque in accordance with a largest peak value of one or more second or subsequent peak values.

A torque calculation method according to an aspect of the present disclosure includes a measurement step and a calculation step. The measurement step includes measuring a torque applied to an output shaft of an impact rotary tool. The impact rotary tool is configured to generate impact force in pulse form from power of a drive source and transmit the impact force from the output shaft to a tip tool. The calculation step includes, when a torque waveform of the torque measured in the measurement step during one impact includes a plurality of peak values, calculating the tightening torque in accordance with a largest peak value of one or more second or subsequent peak values.

A program according to an aspect of the present disclosure is a program configured to cause one or more processors to execute the torque calculation method.

DESCRIPTION OF EMBODIMENTS

Figure 1:
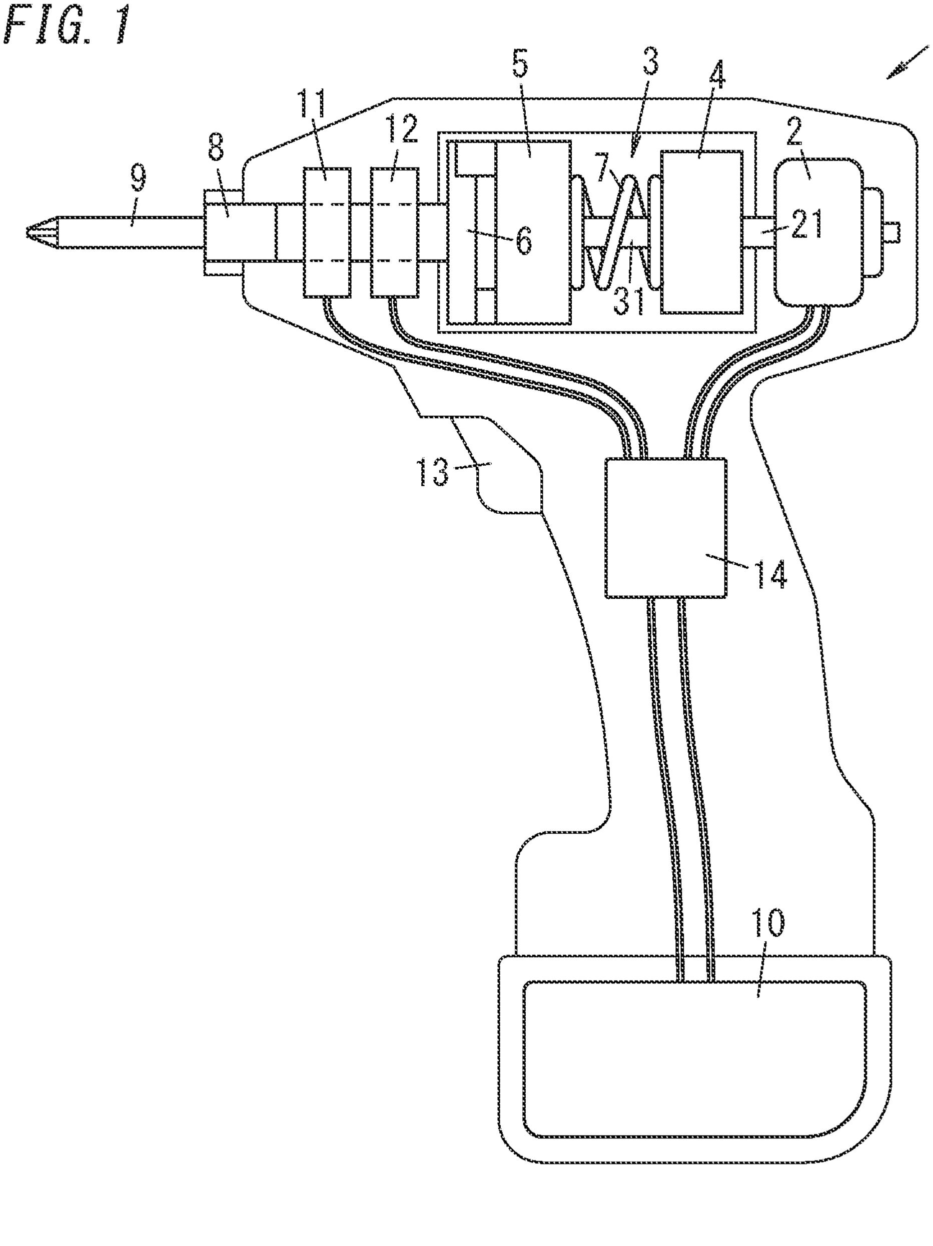
FIG. 1 is a schematic view of an impact rotary tool according to an embodiment.

A preferable embodiment of the present disclosure will be described in detail below with reference to the drawings. Note that in the embodiment described below, common elements are denoted by the same reference signs, and the redundant description of the common elements is omitted. The embodiment described below is a mere example of various embodiments of the present disclosure. The embodiment may be modified in various manners depending on design or the like as long as the object of the present disclosure is achieved. Figures described in the present disclosure are schematic views, and therefore, the ratio of sizes and the ratio of thicknesses of components in the drawings do not necessarily reflect actual dimensional ratios.

(1) Overview

First, the overview of an impact rotary tool 1 according to the present embodiment will be described with reference to FIGS. 1 and 2. In the following description, a direction along an output shaft 8 is defined as a forward/backward direction. A direction from a motor 2 toward a driver bit 9 is defined as "forward", and a direction from the driver bit 9 toward the motor 2 (drive source) is defined as "backward".

As shown in FIG. 1, the impact rotary tool 1 is operated by power (e.g., electric power) from a power source such as a battery pack 10. Specifically, the motor 2 supplied with the electric power from the battery pack 10 rotates and transmits rotary drive force to the output shaft 8. When a tip tool such as the driver bit 9 is attached to the output shaft 8, the impact rotary tool 1 can attach a fastener component (e.g., a screw) to a work piece (process object) which serves as a work target.

Moreover, the impact rotary tool 1 of the present embodiment includes an impact mechanism 3 (impact force generator) configured to generate an impact force in pulse form. The impact mechanism 3 exerts the impact force in a rotation direction on the output shaft 8 when a load torque of the output shaft 8 exceeds a prescribed level. The output shaft 8 on which the impact force has been exerted transmits the impact force to the fastener component. In this way, the impact rotary tool 1 can give an increased tightening torque to the fastener component. Examples of the impact rotary tool 1 include various types of tools such as impact drivers and impact wrenches. The impact rotary tool 1 of the present embodiment is an impact driver including an output shaft 8 to which a driver bit 9 is attachable.

Figure 2:
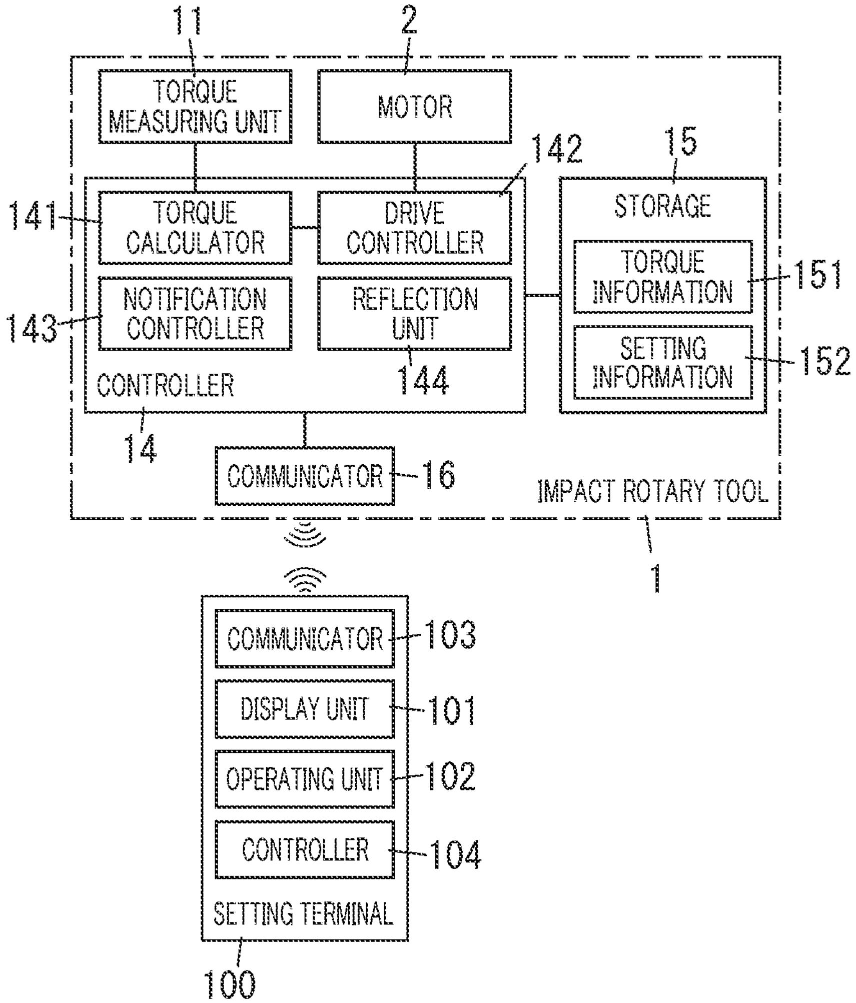
FIG. 2 is a block diagram of the impact rotary tool.

As shown in FIG. 2, the impact rotary tool 1 of the present embodiment includes a torque measuring unit 11 and a torque calculator 141. The torque measuring unit 11 measures a torque applied to the output shaft 8. The torque calculator 141 calculates a tightening torque in accordance with the torque measured by the torque measuring unit 11.

The torque measuring unit 11 of the present embodiment further measures a torque waveform of the torque applied to the output shaft 8 during each of impacts exerted on the output shaft 8. Moreover, when the torque waveform measured by the torque measuring unit 11 includes a plurality of peak values, the torque calculator 141 of the present embodiment calculates the tightening torque in accordance with a largest peak value of one or more second or subsequent peak values.

The impact rotary tool 1 of the present embodiment calculates the tightening torque in accordance with, not a first peak value at which the torque is highly likely not to have been transmitted to the tip tool, but the one or more second or subsequent peak values, in the torque waveform, thereby improving the accuracy of tightening torque calculation.

(2) Configuration of Impact Rotary Tool

A detailed configuration of the impact rotary tool 1 according to the present embodiment will be described below with reference to FIGS. 1 to 3.

As shown in FIG. 1, the battery pack 10, which is rechargeable, is detachably attached to the impact rotary tool 1. The impact rotary tool 1 of the present embodiment operates by using the battery pack 10 as a power supply. That is, the battery pack 10 is a power supply which supplies a current for driving the motor 2. The battery pack 10 is not a constituent element of the impact rotary tool 1. However, the impact rotary tool 1 may include the battery pack 10. The battery pack 10 includes: an assembled battery including plurality of secondary batteries (e.g., lithium ion batteries) connected to each other in series; and a case housing the assembled battery.

As shown in FIG. 1, the impact rotary tool 1 includes the motor 2, the impact mechanism 3, the output shaft 8, the torque measuring unit 11, a rotation measuring unit 12, and a trigger controller 13.

The trigger controller 13 is an operating unit that receives an operation for controlling the rotation of the motor 2. A pulling operation given to the trigger controller 13 switches ON/OFF the motor 2. Moreover, the rotational speed of the motor 2 is adjustable based on a pulled amount of the trigger controller 13 by the pulling operation. As the pulled amount increases, the rotational speed of the motor 2 increases.

The motor 2 is, for example, a brushless motor. The motor 2 includes a rotational axis 21 and converts the electric power supplied from the battery pack 10 into rotary drive force of the rotational axis 21.

The impact mechanism 3 generates impact force in pulse form from power of the motor 2. The impact mechanism 3 includes a drive shaft 31, a speed reducer 4, a hammer 5, an anvil 6, and a spring 7. The drive shaft 31 is disposed between the motor 2 and the output shaft 8.

The speed reducer 4 reduces the rotary drive force of the rotational axis 21 of the motor 2 by a prescribed reduction gear ratio and then transmits the rotary drive force to the drive shaft 31.

The hammer 5 moves with respect to the anvil 6, receives the power from the motor 2, and exerts a rotational strike (impact) on the anvil 6. The hammer 5 is movable with respect to the drive shaft 31 in an axial direction (forward/backward direction) of the drive shaft 31 and is rotatable with respect to the drive shaft 31. As the hammer 5 moves toward the anvil 6, or away from the anvil 6, along the axial direction of the drive shaft 31, the hammer 5 rotates with respect to the drive shaft 31. Moreover, the hammer 5 is rotatable with respect to the spring 7.

The anvil 6 is formed as one piece integrated with the output shaft 8. The anvil 6 faces the hammer 5 in the axial direction of the drive shaft 31. While the impact mechanism 3 does not give an impacting operation, the drive shaft 31, the hammer 5, and the anvil 6 rotate together.

The spring 7 lies between the speed reducer 4 and the hammer 5. The spring 7 of the present embodiment is, for example, a conical spring. The spring 7 applies force toward the output shaft 8 (forward force) to the hammer 5 in a direction along the axial direction of the drive shaft 31.

That the hammer 5 moves toward the anvil 6 in the axial direction of the drive shaft 31 is referred to as "the hammer 5 moves forward" in the following description. Moreover, that the hammer 5 moves away from the anvil 6 in the axial direction of the drive shaft 31 is referred to as the "hammer 5 moves backward" in the following description.

The impact mechanism 3 starts the impacting operation when the load torque is greater than or equal to a prescribed value. That is, as the load torque increases, a component force in a direction in which the hammer 5 moves backward also increases in force generated between the hammer 5 and the anvil 6. when the load torque is greater than or equal to a prescribed value, the hammer 5 moves backward while the hammer 5 compresses the spring 7. Then, the hammer 5 rotates while the hammer 5 moves backward. Thereafter, the hammer 5 receives returning force from the spring 7 and moves forward. Then, the hammer 5 exerts a rotational impact on the anvil 6 approximately every half turn of the drive shaft 31.

In this way, in the impact mechanism 3, the hammer 5 repeatedly exerts an impact to the anvil 6. The torque produced by the impact enables a fastening member such as a screw, bolt, or nut to be tightened more strongly than in the case where no impact is exerted.

To the output shaft 8, the driver bit 9 as a tip tool is attached. The output shaft 8 transmits, to the driver bit 9, the rotary drive force transmitted from the drive shaft 31. Thus, the driver bit 9 rotates. The driver bit 9 is brought into contact with the fastener member, and in this state, the driver bit 9 is rotated, thereby tightening or loosening the fastener member. Moreover, the output shaft 8 transmits, to the driver bit 9, rotational striking force (impact force) transmitted from the impact mechanism 3.

Note that the driver bit 9 is detachably attachable to the output shaft 8. In the present embodiment, the tip tool such as the driver bit 9 is not a constituent element of the impact rotary tool 1. However, the tip tool may be included in constituent elements of the impact rotary tool 1.

The torque measuring unit 11 is, for example, a magnetostrictive distortion sensor configured to detect twisting distortion. The torque measuring unit 11 uses a coil arranged on a non-rotating portion to detect changes in magnetic permeability that correspond to the deformation of the output shaft 8 that occurs when a torque is applied to the output shaft 8. The torque measuring unit 11 then outputs a voltage signal proportional to the distortion to a controller 14 which will be described later.

The rotation measuring unit 12 is, for example, a rotary encoder and outputs an angle of rotation of the output shaft 8 as a digital signal to the controller 14.

As shown in FIG. 2, the impact rotary tool 1 of the present embodiment further include the controller 14, a storage 15, and a communicator 16.

The storage 15 includes, for example, semiconductor memory. The storage 15 stores torque information 151 and setting information 152. The torque information 151 includes, for example, information on a tightening torque when the impact rotary tool 1 tightens the fastener component. The setting information 152 includes, for example, information on one or more work procedures and information on, for example, a target torque associated with, for example, the work procedure(s). The "target torque" as mentioned in the present disclosure is a target of a tightening torque when the fastener component is attached.

The communicator 16 employs a wireless communication system compliant with the standard of, for example, Wi-Fi (registered trademark), Bluetooth (registered trademark), ZigBee (registered trademark), or low power radio (specified low power radio) the use of which requires no license. The communicator 16 performs wireless communication with a setting terminal 100 which will be described later. However, the communicator 16 may perform communication with the setting terminal 100 based on a wired communication system.

The controller 14 includes a computer system including one or more processors and memory. The processor(s) in the computer system executes a program stored in the memory of the computer system, thereby implementing at least some functions of the controller 14. The program may be stored in the memory, may be provided over a telecommunications network such as the Internet, or may be provided as a non-transitory recording medium, such as a memory card, storing the program.

As shown in FIG. 2, the controller 14 includes the torque calculator 141, a drive controller 142, a notification controller 143, and a reflection unit 144.

The torque calculator 141 performs a tightening torque calculation process of calculating a tightening torque in accordance with the torque measured by the torque measuring unit 11. Specifically, the torque calculator 141 of the present embodiment calculates the tightening torque for each impact exerted by the impact mechanism 3 (see FIG. 1) on the output shaft 8 (see FIG. 1).

Figure 3:
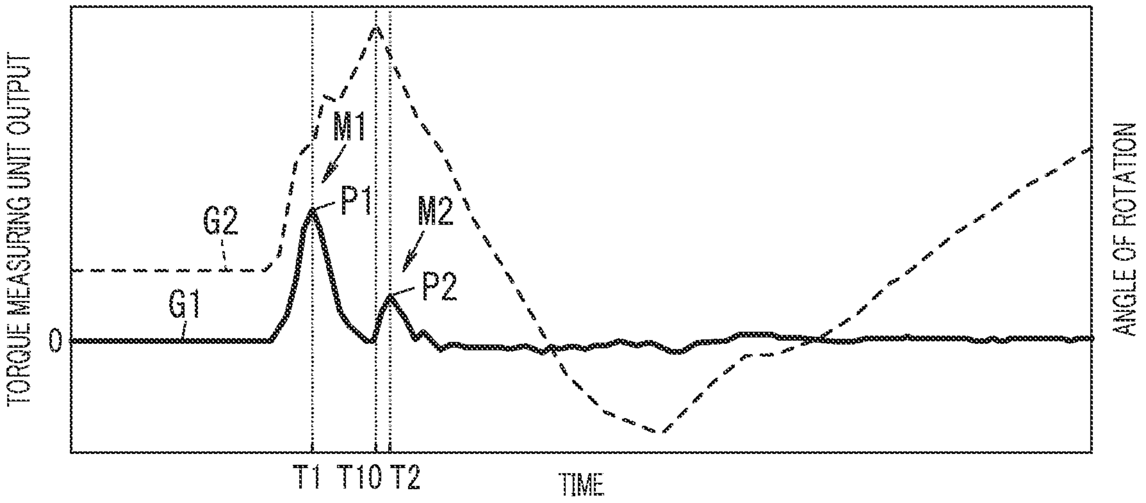
FIG. 3 is a view of a graph showing a relationship between a torque waveform and an angle of rotation of an output shaft of the impact rotary tool.

FIG. 3 shows a graph representing a relationship between a torque waveform G1 measured by the torque measuring unit 11 (see FIG. 2) during one impact and an angle of rotation G2 of the output shaft 8 (see FIG. 1) measured by the rotation measuring unit 12 (see FIG. 2). As shown in FIG. 3, there is a case where the torque waveform G1 in each impact include a plurality of (in the example shown in FIG. 3, two) peak values. In the example shown in FIG. 3, two peak values, a peak value P1 and a peak value P2, are included in the torque waveform. The "peak value" as mentioned in the present disclosure means a maximal value which is in the torque waveform and which is a value larger than or equal to a predetermined value. When the torque waveform measured during one impact includes a plurality of peak values, the torque calculator 141 of the present embodiment calculates the tightening torque in accordance with a largest peak value of one or more second or subsequent peak values (in the example shown in FIG. 3, peak value P2). When the torque waveform includes a plurality of peak values, a timing of a first peak value (in the example shown in FIG. 3, the peak value P1) is a timing at which a clearance (backlash) among the output shaft 8, the tip tool, and the fastener component is filled and at which the torque is highly likely not to have been transmitted to the fastener component. Therefore, the torque calculator 141 does not calculate the tightening torque in accordance with the first peak value.

Moreover, at a point at which the output shaft 8 is switched from a fastening direction to an inverse direction, a state where the torque is applied to the output shaft 8 changes to a state where the torque is not applied to the output shaft 8. In the example shown in FIG. 3, at a timing T10, the state where the torque is applied to the output shaft 8 changes to the state where the torque is not applied to the output shaft 8. Thus, the torque applied to the output shaft 8 at a time point corresponding to the timing T10 could be considered to be an actual tightening torque. Here, the timing T10 is close to a timing T2 of the peak value P2 of a second or subsequent (in the example shown in FIG. 3, a second) mountain M2 of the torque waveform G1. That is, FIG. 3 shows that calculating the tightening torque in accordance with the peak value P2 of the second or subsequent mountain M2 is appropriate.

In contrast, at a timing T1 of the peak value P1 of a first mountain M1, the angle of rotation G2 is in the process of increasing. That is, FIG. 3 shows that calculating the tightening torque in accordance with the peak value P1 of the first mountain M1 is inappropriate.

As described above, the impact rotary tool 1 of the present embodiment does not calculate the tightening torque in accordance with the first peak value which is included in the torque waveform measured during one impact and at which the torque is highly likely not to have been transmitted to the tip tool. Therefore, the impact rotary tool 1 of the present embodiment can improve the accuracy of tightening torque calculation.

Details of the tightening torque calculation process will be described in "(4) Tightening Torque Calculation Process". The torque calculator 141 shown in FIG. 2 outputs, to the drive controller 142, information on the tightening torque calculated in the tightening torque calculation process.

The drive controller 142 controls the operation of the motor 2. The drive controller 142 of the present embodiment stops the motor 2 when the tightening torque calculated by the torque calculator 141 reaches the target torque. The drive controller 142 of the present embodiment determines, based on the target torque included in the setting information 152 stored in the storage 15, whether or not the tightening torque calculated by the torque calculator 141 reaches the target torque.

The notification controller 143 controls notification of information on the tightening torque calculated by the torque calculator 141. The notification controller 143 of the present embodiment causes a display unit 101 (communication device) of the setting terminal 100 to display the information on the tightening torque via the communicator 16. Note that the notification controller 143 may cause a loudspeaker (communication device) to output the information on the tightening torque in voice. Moreover, when the impact rotary tool 1 includes a display unit and/or a loudspeaker as a communication device(s), the notification controller 143 may cause the display unit and/or the loudspeaker included in the impact rotary tool 1 to perform notification of the information on the tightening torque. Moreover, the notification controller 143 may, for example, notify of a work procedure and/or notify of a target torque value corresponding to the work procedure.

The reflection unit 144 reflects the torque information 151 stored in the storage 15 in a setting relating to fastening of the fastener component by the impact rotary tool 1. In other words, the reflection unit 144 reflects past work data in the setting relating to fastening of the fastener component. For example, when the torque information 151 is associated with the type of the fastener component, the target torque, and the number of impacts (strikes) when the tightening torque reaches the target torque, the impact rotary tool 1 can perform torque management also by managing the number of impacts in accordance with the type of the fastener component and the target torque. That is, the output of the motor 2, for example, can be more appropriately adjusted in accordance with the fastener component. Moreover, since the past work data is reflected in the setting relating to fastening of the fastener component, time and effort of a worker in providing the setting relating to fastening of the fastener component can be reduced.

(3) Configuration of Setting Terminal

A detailed configuration of the setting terminal 100 according to the present embodiment will be described below with reference to FIG. 2.

The setting terminal 100 is, for example, an information terminal such as a personal computer (PC), a smartphone, or a tablet computer. As shown in FIG. 2, the setting terminal 100 includes the display unit 101, an operating unit 102, a communicator 103, and a controller 104.

The communicator 103 employs a wireless communication system compliant with the standard of, for example, Wi-Fi (registered trademark), Bluetooth (registered trademark), ZigBee (registered trademark), or low power radio (specified low power radio) the use of which requires no license. The communicator 103 performs wireless communication with the impact rotary tool 1 which will be described later. However, the communicator 103 may perform communication with the impact rotary tool 1 based on a wired communication system.

The display unit 101 and the operating unit 102 may be, for example, an integrally formed touch panel display. The display unit 101 of the present embodiment displays the information on the tightening torque in response to an instruction given by the notification controller 143 of the impact rotary tool 1.

The controller 104 includes a computer system including one or more processors and memory. The processor(s) in the computer system executes a program stored in the memory of the computer system, thereby implementing at least some functions of the controller 104. The program may be stored in the memory, may be provided over a telecommunications network such as the Internet, or may be provided as a non-transitory recording medium, such as a memory card, storing the program. The controller 104 is configured to control the display unit 101, the operating unit 102, and the communicator 103.

(4) Tightening Torque Calculation Process

Details of the tightening torque calculation process (torque calculation method) will be described below with reference to FIGS. 4 to 7.

Figure 4:
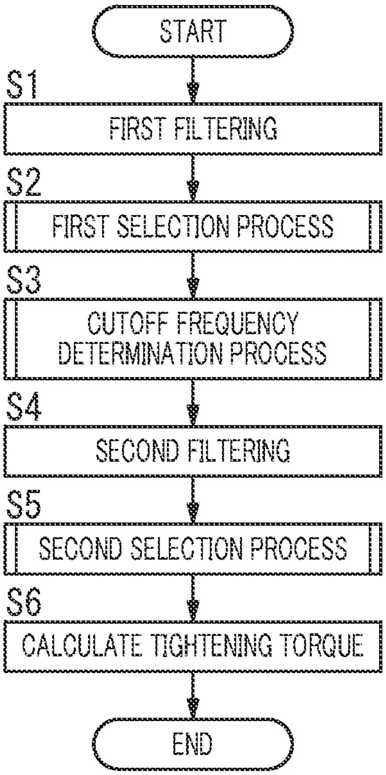
FIG. 4 is a flowchart of a torque calculation process performed by the impact rotary tool.

FIG. 4 is a flowchart showing a procedure of the tightening torque calculation process. First, the torque calculator 141 performs first filtering of the torque waveform of the torque measured by the torque measuring unit 11 (S1). In the first filtering, the torque calculator 141 cuts noise of a high frequency component by using a low-pass filter having a prescribed cutoff frequency. Here, the prescribed cutoff frequency is a frequency higher than a cutoff frequency of a low-pass filter used in second filtering which will be described later.

Figure 5:
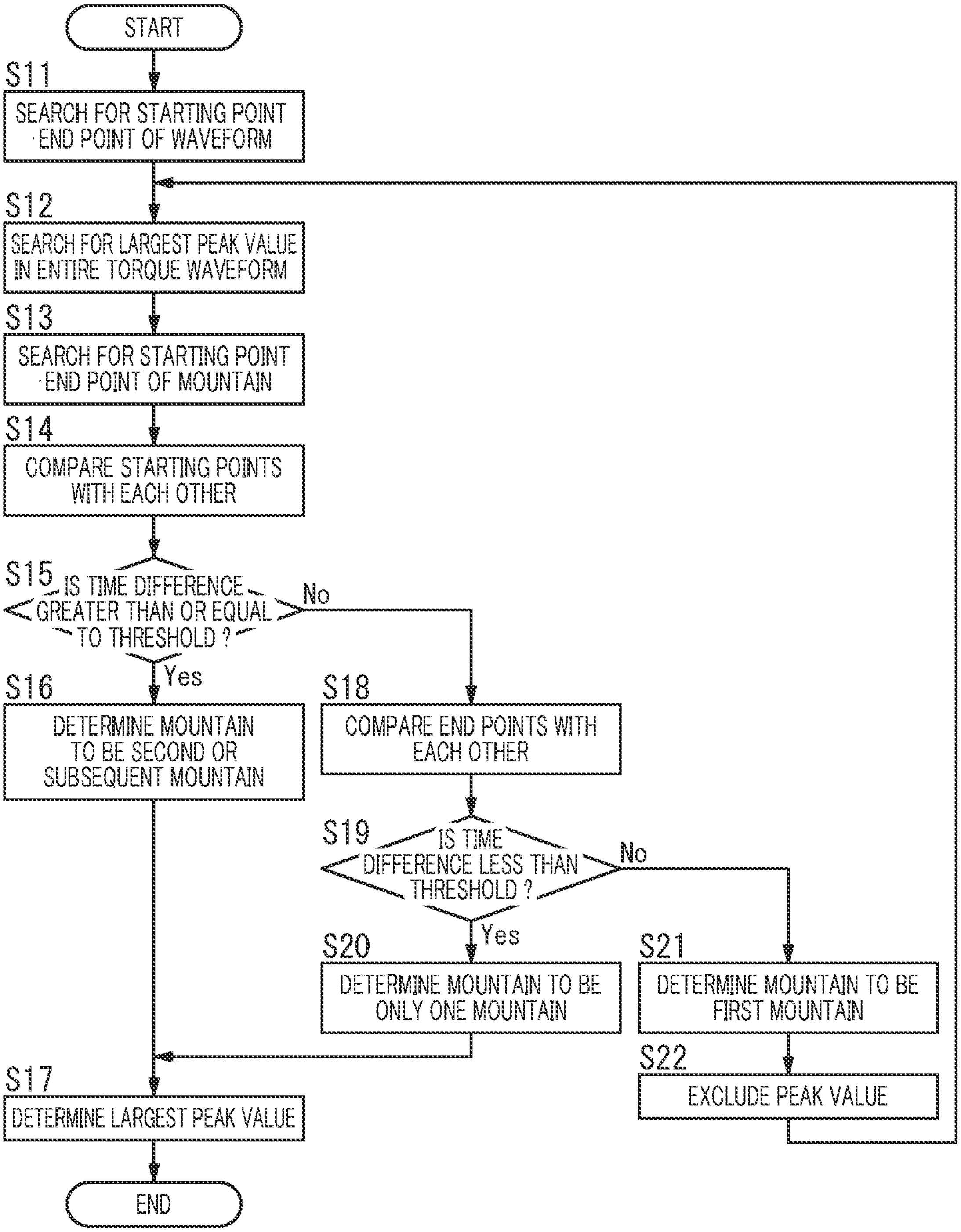
FIG. 5 is a flowchart of a selection process performed by the impact rotary tool.

Then, the torque calculator 141 performs a first selection process (S2). The first selection process is a process of selecting a peak value included in the torque waveform to determine the cutoff frequency of the low-pass filter used in the second filtering. FIG. 5 is a flowchart of the first selection process (S2) and a second selection process (S5) which will be described later. The torque calculator 141 searches for a starting point and an end point of the entire torque waveform (S11). Specifically, the torque calculator 141 searches for an inflection point, as the starting point of the entire torque waveform, from a first rise of the entire torque waveform and searches for an inflection point, as the end point of the entire torque waveform, from a last fall of the entire torque waveform. Then, the torque calculator 141 searches for a peak value which is largest in the entire torque waveform and temporarily selects the peak value (S12). In other words, the torque calculator 141 searches for a global maximum of the entire torque waveform. Next, the torque calculator 141 searches for a starting point and an end point of a mountain including the peak value temporarily selected (S13). The "mountain" as mentioned in the present disclosure is a mountain-shaped (convex) part of the torque waveform, wherein the mountain-like part has a starting point which is the point of a rise and an end point which is the point of a fall provided that the peak value is a crest. The torque calculator 141 of the present embodiment searches for the inflection point adjacent to the peak value temporarily selected, thereby searching for the starting point and the end point of the mountain. Specifically, of two inflection points adjacent to the peak value temporarily selected in the torque waveform, an inflection point preceding the peak value temporarily selected is the starting point of the mountain, and an inflection point following the peak value temporarily selected is the end point of the mountain.

After the torque calculator 141 searches for the starting point and the end point of the mountain, the torque calculator 141 compares the starting point of the entire torque waveform with the starting point of the mountain, thereby determining a time difference (S14). If the time difference between the starting point of the entire torque waveform and the starting point of the mountain is greater than or equal to a threshold Th1 (see FIG. 7) (Yes in S15), the torque calculator 141 determines that the mountain including the peak value temporarily selected is a second or subsequent mountain (S16). The "second or subsequent mountain" means not being the first mountain. When the torque calculator 141 determines that the mountain including the peak value temporarily selected is the second or subsequent mountain, the torque calculator 141 determines the peak value temporarily selected to be the largest peak value (S17). Once the torque calculator 141 determines the largest peak value, the torque calculator 141 ends the first selection process (S2).

In contrast, if in the process in step S15, the time difference between the starting point of the entire torque waveform and the starting point of the mountain is less than the threshold Th1 (No in S15), the torque calculator 141 compares the end point of the entire torque waveform with the end point of the mountain, thereby determining a time difference (S18). If the time difference between the end point of the entire torque waveform and the end point of the mountain is less than a threshold Th2 (see FIG. 7) (Yes in S19), the torque calculator 141 determines that the torque waveform includes only the mountain including the peak value temporarily selected (S20). In other words, the torque calculator determines that the entire torque waveform is one mountain. If the torque waveform includes only one peak value, the torque calculator 141 of the present embodiment calculates the tightening torque in accordance with the one peak value. When the torque calculator 141 determines that the entire torque waveform is one mountain, the torque calculator 141 determines the peak value temporarily selected to be the largest peak value (S17). Once the torque calculator 141 determines the largest peak value, the torque calculator 141 ends the first selection process (S2).

Moreover, in the process in step S19, if the time difference between the end point of the entire torque waveform and the end point of the mountain is greater than or equal to the threshold Th2, that is, if the time difference is not less than the threshold Th2 (No in S19), the torque calculator 141 determines the mountain including the peak value temporarily selected to be the first mountain (S21). When the mountain including the peak value temporarily selected is the first mountain, calculating the tightening torque in accordance with the peak value temporarily selected is highly likely to be inappropriate. Therefore, the torque calculator 141 excludes the peak value temporarily selected from targets for which the search is to be conducted (S22) and searches again for the largest peak value (S12). Then, the torque calculator 141 performs the first selection process (S2) until the torque calculator 141 determines the largest peak value (S17). Note that in the first selection process, determining the largest peak value by the torque calculator 141 may be referred to as a "temporary determination of the largest peak value".

Figure 6:
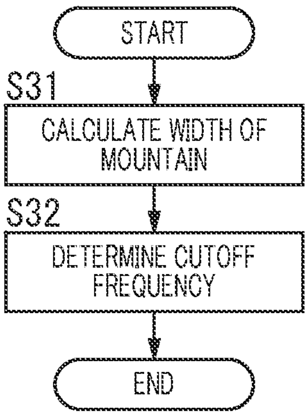
FIG. 6 is a flowchart of a cutoff frequency determination process performed by the impact rotary tool.

After the first selection process (S2), the torque calculator 141 performs a cutoff frequency determination process (S3). FIG. 6 is a flowchart showing a procedure of the cutoff frequency determination process (S3). From the starting point and the end point of the mountain including the largest peak value, the torque calculator 141 calculates the width of the mountain (S31). The "width of the mountain" as mentioned in the present disclosure is a time period from the rise to the fall of the mountain. In other words, a time period from the starting point of the mountain to the end point of the mountain. Moreover, the "width of the mountain" substantially corresponds to the half period of the mountain. The torque calculator 141 calculates the width of the mountain, and then, the torque calculator 141 determines a cutoff frequency in accordance with the width of the mountain (S32). Specifically, the torque calculator 141 of the present embodiment determines the inverse number of the width of the mountain to be the cutoff frequency. The cutoff frequency is a frequency higher than the frequency of the mountain. Once the torque calculator 141 determines the cutoff frequency (S32), the torque calculator 141 ends the cutoff frequency determination process (S3).

After the cutoff frequency determination process (S3), the torque calculator 141 performs second filtering on the torque waveform (S4). Note that the second filtering may be performed on the torque waveform after the first filtering or may be performed on the torque waveform which has not undergone the first filtering. In the second filtering, the torque calculator 141 cuts noise of the high frequency component at a cutoff frequency determined in the cutoff frequency determination process (S3). Here, the cutoff frequency determined in the cutoff frequency determination process (S3) is a frequency lower than the cutoff frequency of the low-pass filter used in the first filtering.

After the second filtering (S4), the torque calculator 141 performs a second selection process (S5). The second selection process is a process of selecting, from the torque waveform after the second filtering, a peak value based on which the tightening torque is to be calculated. The second selection process (S5) is the same process as the first selection process (S2) described above, and thus, the description thereof is omitted. After determining the largest peak value in the second selection process (S5), the torque calculator 141 calculates the tightening torque in accordance with the largest peak value (S6). Once the torque calculator 141 calculates the tightening torque (S6), the torque calculator 141 ends the tightening torque calculation process.

Figure 7:
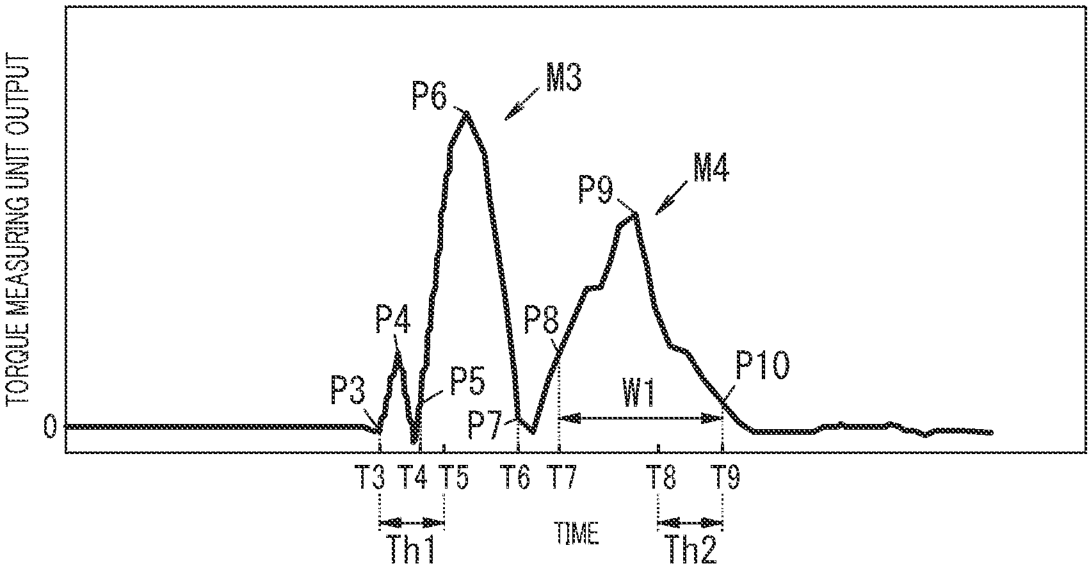
FIG. 7 is a view of a graph showing a torque waveform of the impact rotary tool.

Next, with reference to FIG. 7, the first selection process and the cutoff frequency determination process will be described. FIG. 7 is a graph showing a torque waveform of a torque measured by the torque measuring unit 11 during one impact. When the torque calculator 141 starts the first selection process (S2 in FIG. 4), the torque calculator 141 searches for a starting point P3 and an end point P10 of the entire torque waveform (S11 in FIG. 5). Then, the torque calculator 141 searches for a peak value P6 which is largest in the entire torque waveform, and the torque calculator 141 temporarily selects the peak value P6 (S12 in FIG. 5). Note that a maximal value P4 is a maximal value of the torque waveform but is a value smaller than the predetermined value. Therefore, the maximal value P4 is not included in the "peak value" as mentioned in the present disclosure. Next, the torque calculator 141 searches for a starting point P5 and an end point P7 of a mountain M3 including the peak value P6 temporarily selected (S13 in FIG. 5). After searching for the starting point P5 and the end point P7 of the mountain M3, the torque calculator 141 compares the starting point P3 of the entire torque waveform and the starting point P5 of the mountain M3, thereby determining a time difference (T4−T3) (S14 in FIG. 5). In the example shown in FIG. 7, the time difference (T4−T3) between the starting point P3 of the entire torque waveform and the starting point P5 of the mountain M3 is less than the threshold Th1 (No in S15 in FIG. 5). Next, the torque calculator 141 compares the end point P10 of the entire torque waveform with the end point P7 of the mountain M3, thereby determining a time difference (T9−T6) (S18 in FIG. 5). In the example shown in FIG. 7, the time difference (T9−T6) between the end point P10 of the entire torque waveform and the end point P7 of the mountain M3 is greater than or equal to threshold Th2 (No in S19 in FIG. 5). Then, the torque calculator 141 determines the mountain M3 including the peak value P6 to be the first mountain (S21 in FIG. 5) and excludes the peak value P6 (S22 in FIG. 5).

Next, the torque calculator 141 searches for a peak value P9 which is largest in the entire torque waveform except for the peak value P6, and the torque calculator 141 temporarily selects the peak value P9 (S12 in FIG. 5). The torque calculator 141 then searches for a starting point P8 and an end point P10 of the mountain M4 including the peak value P9 (S13 in FIG. 5). After searching for the starting point P8 and the end point P10 of the mountain M4, the torque calculator 141 compares the starting point P3 of the entire torque waveform and the starting point P8 of the mountain M4, thereby determining a time difference (T7−T3) (S14 in FIG. 5). In the example shown in FIG. 7, the time difference (T7−T3) between the starting point P3 of the entire torque waveform and the starting point P8 of the mountain M4 is greater than or equal to the threshold Th1 (Yes in S15 in FIG. 5), and therefore, the torque calculator 141 determines the mountain M4 including the peak value P9 to be the second or subsequent mountain (S16 in FIG. 5). Then, the torque calculator 141 determines the peak value P9 temporarily selected to be the largest peak value (S17 in FIG. 5) and ends the first selection process (S2 in FIG. 4).

Next, the torque calculator 141 starts the cutoff frequency determination process (S3 in FIG. 4). The torque calculator 141 calculates the width W1 of the mountain M4 from the starting point P8 and the end point P10 of the mountain M4 including the peak value P9 which is largest (S31 in FIG. 6). Then, the torque calculator 141 determines the inverse number of the width W1 of the mountain M4 to be the cutoff frequency (S32 in FIG. 6) and ends the cutoff frequency determination process (S3 in FIG. 4).

(5) Operation and Advantages

As described above, the impact rotary tool 1 of the present embodiment includes the impact mechanism 3, the output shaft 8, the torque measuring unit 11, and the torque calculator 141. When a torque waveform of a torque measured by the torque measuring unit 11 during one impact includes a plurality of peak values, the torque calculator 141 calculates the tightening torque in accordance with a largest peak value of one or more second or subsequent peak values. Thus, the impact rotary tool 1 of the present embodiment does not calculate the tightening torque in accordance with the first peak value at which the torque is highly likely not to have been transmitted to the tip tool, thereby improving the accuracy of tightening torque calculation.

Moreover, the torque calculator 141 of the present embodiment calculates the tightening torque after performing, on the torque waveform, the process (second filtering) that cuts a frequency component which is higher than a frequency of the mountain including the largest peak value. Removing the high-frequency noise component superposed on the torque waveform can further improve the accuracy of tightening torque calculation.

Moreover, the torque calculator 141 of the present embodiment temporarily selects a peak value which is largest in the torque waveform (first selection process). Furthermore, the torque calculator 141 of the present embodiment derives the cutoff frequency from the width between the starting point and the end point of the mountain including the peak value temporarily selected (cutoff frequency determination process) and performs the second filtering. The torque calculator (141) selects a largest peak value included in the torque waveform after the second filtering (second selection process), and the torque calculator (141) calculates the tightening torque in accordance with the peak value thus selected. After the largest peak value is temporarily selected and the second filtering based on the width of the mountain including the largest peak value is performed, the tightening torque is calculated in accordance with the largest peak value selected from the torque waveform after the second filtering, and therefore, the accuracy of tightening torque calculation can be further improved.

Moreover, when the torque waveform includes one peak value, the torque calculator 141 of the present embodiment calculates the tightening torque in accordance with the one peak value. When the torque waveform includes only one peak value, calculating the tightening torque in accordance with the one peak value can improve the accuracy of tightening torque calculation.

Moreover, the impact rotary tool 1 of the present embodiment further includes the drive controller 142. The drive controller 142 stops the motor 2 when the tightening torque calculated by the torque calculator 141 reaches the target torque. Therefore, the impact rotary tool 1 of the present embodiment can perform appropriate fastening operation.

Moreover, the impact rotary tool 1 of the present embodiment further includes the notification controller 143. The notification controller 143 controls notification of the information on the tightening torque calculated by the torque calculator 141, and thereby, a worker or the like who uses the impact rotary tool 1 can verify the tightening torque.

Moreover, the notification controller 143 of the present embodiment causes the display unit 101 of the setting terminal 100 to display the information on the tightening torque. The worker and the like can verify the information on the tightening torque by viewing the display unit 101 even in, for example, noise.

Moreover, the impact rotary tool 1 of the present embodiment further includes the storage 15 and the reflection unit 144. The reflection unit 144 reflects the information on the tightening torque stored in the storage 15 in a setting regarding fastening of the work target, thereby further appropriately perform adjustment of the like of the output of the motor 2.

(6) Variations

Variations of the embodiment will be enumerated below. The variations described below are accordingly applicable in combination with the embodiment.

Moreover, functions equivalent to those of the impact rotary tool 1 of the embodiment described above may be implemented by, for example, a torque calculation method, a (computer) program, or a non-transitory recording medium storing the program. A torque calculation method according to an aspect includes a measurement step and a calculation step. The measurement step includes measuring a torque applied to the output shaft 8 of the impact rotary tool 1. The impact rotary tool 1 generates impact force in pulse form from power of the motor 2 and transmits the impact force from the output shaft 8 to the tip tool (driver bit 9). The calculation step includes, when a torque waveform of the torque measured in the measurement step during one impact includes a plurality of peak values, calculating the tightening torque in accordance with a largest peak value of one or more second or subsequent peak values. A program according to an aspect is a program configured to cause one or more processors to execute the torque calculation method.

Collecting constituent elements of the impact rotary tool 1 in one housing is not an essential configuration. The constituent elements of the impact rotary tool 1 may be distributed in a plurality of housings. For example, the torque calculator 141 may be disposed in a housing other than a housing in which the motor 2, the impact mechanism 3, and the like are disposed.

In the embodiment described above, the impact rotary tool 1 is, for example, an impact driver. However, the impact rotary tool 1 is not limited to the impact driver but may be, for example, an impact wrench.

Summary

As described above, an impact rotary tool (1) of a first aspect includes a drive source (motor 2), an impact force generator (impact mechanism 3), an output shaft (8), a torque measuring unit (11), and a torque calculator (141). The impact force generator is configured to generate impact force in pulse form from power of the drive source. The output shaft (8) is configured to transmit the impact force to a tip tool (driver bit 9). The torque measuring unit (11) is configured to measure a torque applied to the output shaft (8). The torque calculator (141) is configured to calculate a tightening torque in accordance with the torque measured by the torque measuring unit (11). The torque calculator (141) is configured to, when a torque waveform of the torque measured by the torque measuring unit (11) during one impact includes a plurality of peak values, calculate the tightening torque in accordance with a largest peak value of one or more second or subsequent peak values.

In this aspect, the tightening torque value is not calculated based on a first peak value which is included in the torque waveform measured during one impact and at which the torque is highly likely not to have been transmitted to the tip tool (driver bit 9). Thus, this aspect enables the tightening torque to be accurately calculated.

In an impact rotary tool (1) of a second aspect referring to the first aspect, the torque calculator (141) is configured to perform, on the torque waveform, a process of cutting a frequency component which is higher than a frequency of the mountain including the largest peak value and calculate the tightening torque in accordance with a largest peak value included in the torque waveform after the process.

With this aspect, removing a high-frequency noise component superposed on the torque waveform enables the accuracy of tightening torque calculation to be increased.

In an impact rotary tool (1) of a third aspect referring to the second aspect, the torque calculator (141) is configured to select the largest peak value included in the torque waveform. The torque calculator (141) is configured to derive a cutoff frequency in accordance with a width of the mountain and perform, on the torque waveform, the process using the cutoff frequency. The torque calculator (141) is configured to calculate the tightening torque in accordance with the largest peak value included in the torque waveform after the process.

With this aspect, after the largest peak value is temporarily selected and the process based on the width of the mountain including the largest peak value is performed on the torque waveform, the tightening torque is calculated in accordance with the largest peak value selected from the torque waveform after the process, and therefore, the accuracy of tightening torque calculation can be further improved.

In an impact rotary tool (1) of a fourth aspect referring to any one of the first to third aspects, the torque calculator (141) is configured to, when the torque waveform includes one peak value, calculate the tightening torque in accordance with the one peak value.

With this aspect, if the torque waveform measured during one impact includes only one peak value, the tightening torque is calculated based on the one peak value, thereby improving the accuracy of tightening torque calculation.

An impact rotary tool (1) of a fifth aspect referring to any one of the first to fourth aspects further includes a drive controller (142). The drive controller (142) is configured to stop the drive source (motor 2) when the tightening torque calculated by the torque calculator (141) reaches a target torque.

With this aspect, stopping the drive source (motor 2) when the tightening torque calculated by the torque calculator (141) reaches the target torque enables a fastening operation to be appropriately performed.

An impact rotary tool (1) of a sixth aspect referring to any one of the first to fifth aspects further includes a notification controller (143). The notification controller (143) is configured to control notification of information on the tightening torque calculated by the torque calculator (141).

With this aspect, notifying of the information on the tightening torque calculated by the torque calculator (141) enables a worker who uses the impact rotary tool (1) to verify the tightening torque.

In an impact rotary tool (1) of a seventh aspect referring to the sixth aspect, the notification controller (143) is configured to cause a display unit (101) to display the information on the tightening torque.

With this aspect, causing the display unit (101) to display the information on the tightening torque enables a worker or the like to verify the tightening torque even in noise.

An impact rotary tool (1) of an eighth aspect referring to any one of the first to seventh aspects further includes a storage (15) and a reflection unit (144). The storage (15) is configured to store information on the tightening torque calculated by the torque calculator (141). The reflection unit (144) is configured to reflect the information stored in the storage (15) in a setting relating to fastening of a work target.

With this aspect, reflecting the information on the tightening torque calculated by the torque calculator (141) in the setting relating to the fastening of the work target enables an output of the drive source (motor 2) to be, for example, further appropriately adjusted.

The configurations other than that of the first aspect are not essential configurations for the impact rotary tool (1) and are accordingly omittable.

A torque calculation method of a ninth aspect includes a measurement step and a calculation step. The measurement step includes measuring a torque applied to an output shaft (8) in an impact rotary tool (1). The impact rotary tool (1) is configured to generate impact force in pulse form from power of a drive source and transmit the impact force from the output shaft (8) to a tip tool (driver bit 9). The calculation step includes, when a torque waveform of the torque measured in the measurement step during one impact includes a plurality of peak values, calculating a tightening torque in accordance with a largest peak value of one or more second or subsequent peak values.

With this aspect, the tightening torque value is not calculated in accordance with a first peak value which is included in the torque waveform measured during one impact and at which the torque is highly likely not to have been transmitted to the tip tool (driver bit 9), and therefore, the tightening torque can be accurately calculated.

A program of a tenth aspect is a program configured to cause one or more processors to execute the torque calculation method of the ninth aspect.

REFERENCE SIGNS LIST

1 Impact Rotary Tool
2 Motor (Drive Source)
3 Impact Mechanism (Impact Force Generator)
8 Output Shaft
9 Driver Bit (Tip Tool)
11 Torque Measuring Unit
141 Torque Calculator
142 Drive Controller
143 Notification Controller
144 Reflection Unit

15 Storage
101 Display Unit

The invention claimed is:

1. An impact rotary tool comprising:
a drive source;
an impact force generator configured to generate impact force in pulse form from power of the drive source;
an output shaft configured to transmit the impact force to a tip tool;
a torque measuring unit configured to measure a torque applied to the output shaft; and
a torque calculator configured to calculate a tightening torque in accordance with the torque measured by the torque measuring unit;
the torque calculator being configured to, when a torque waveform of the torque measured by the torque measuring unit during one impact includes a plurality of peak values, calculate the tightening torque in accordance with a largest peak value of one or more second or subsequent peak values.

2. The impact rotary tool of claim 1, wherein
the torque calculator is configured to
perform, on the torque waveform, a process of cutting a frequency component which is higher than a frequency of a mountain including the largest peak value and
calculate the tightening torque in accordance with the largest peak value included in the torque waveform after the process.

3. The impact rotary tool of claim 2, wherein
the torque calculator is configured to
select the largest peak value included in the torque waveform,
derive a cutoff frequency in accordance with a width of the mountain,
perform, on the torque waveform, the process using the cutoff frequency, and
calculate the tightening torque in accordance with the largest peak value included in the torque waveform after the process.

4. The impact rotary tool of claim 1, wherein
the torque calculator is configured to, when the torque waveform includes one peak value, calculate the tightening torque in accordance with the one peak value.

5. The impact rotary tool of claim 1, further comprising a drive controller configured to stop the drive source when the tightening torque calculated by the torque calculator reaches a target torque.

6. The impact rotary tool of claim 1, further comprising a notification controller configured to control notification of information on the tightening torque calculated by the torque calculator.

7. The impact rotary tool of claim 6, wherein
the notification controller is configured to cause a display unit to display the information on the tightening torque.

8. The impact rotary tool of claim 1, further comprising:
a storage configured to store information on the tightening torque calculated by the torque calculator; and
a reflection unit configured to reflect the information stored in the storage in a setting relating to fastening of a work target.

9. A torque calculation method comprising:
a measurement step of measuring a torque applied to an output shaft of an impact rotary tool, the impact rotary tool being configured to generate impact force in pulse form from power of a drive source and transmit the impact force from the output shaft to a tip tool; and
calculation step of, when a torque waveform of the torque measured in the measurement step during one impact includes a plurality of peak values, calculating a tightening torque in accordance with a largest peak value of one or more second or subsequent peak values.

10. A non-transitory storage medium storing thereon a program configured to cause one or more processors to execute the torque calculation method of claim 9.

* * * * *